United States Patent Office 3,506,031
Patented Apr. 14, 1970

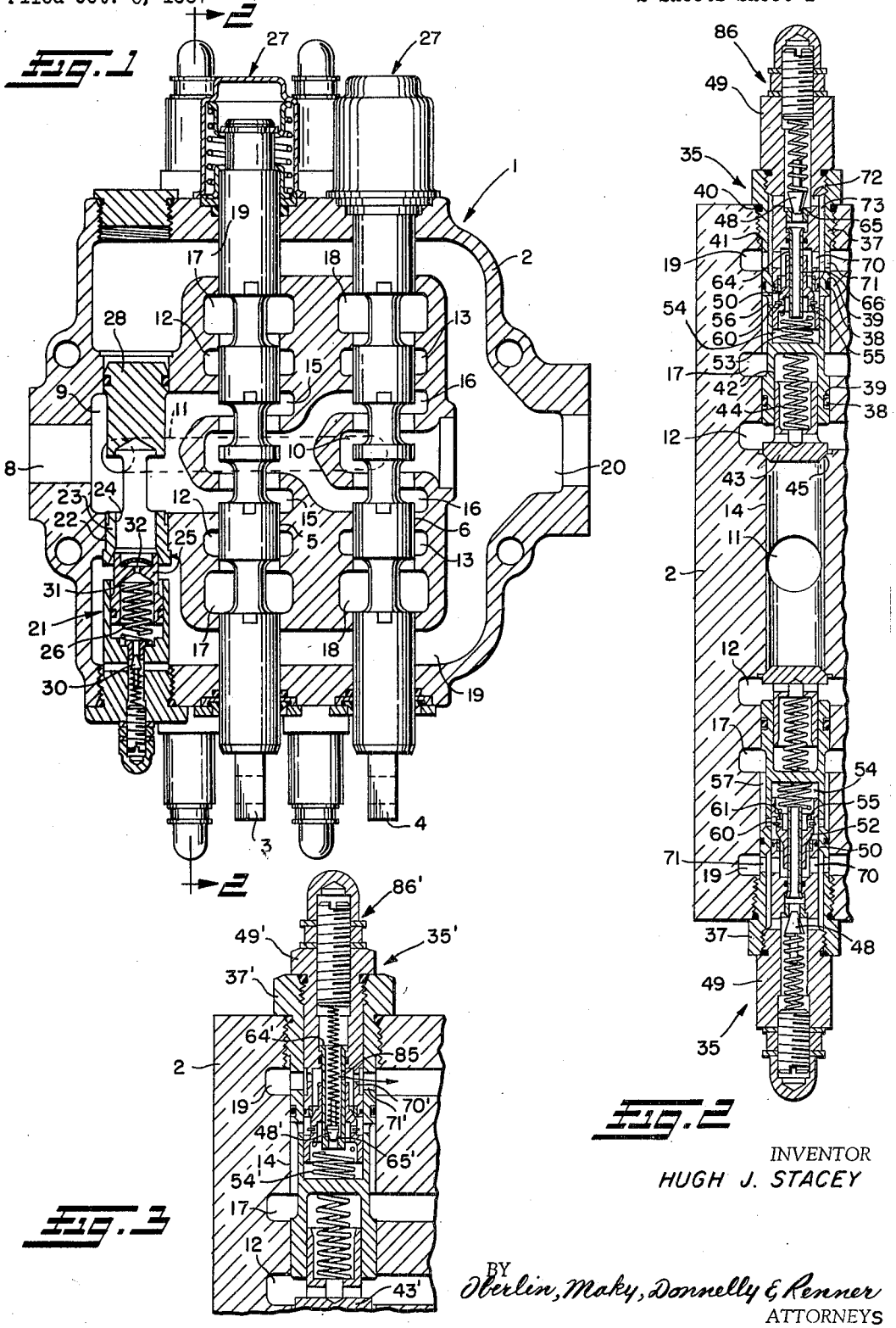

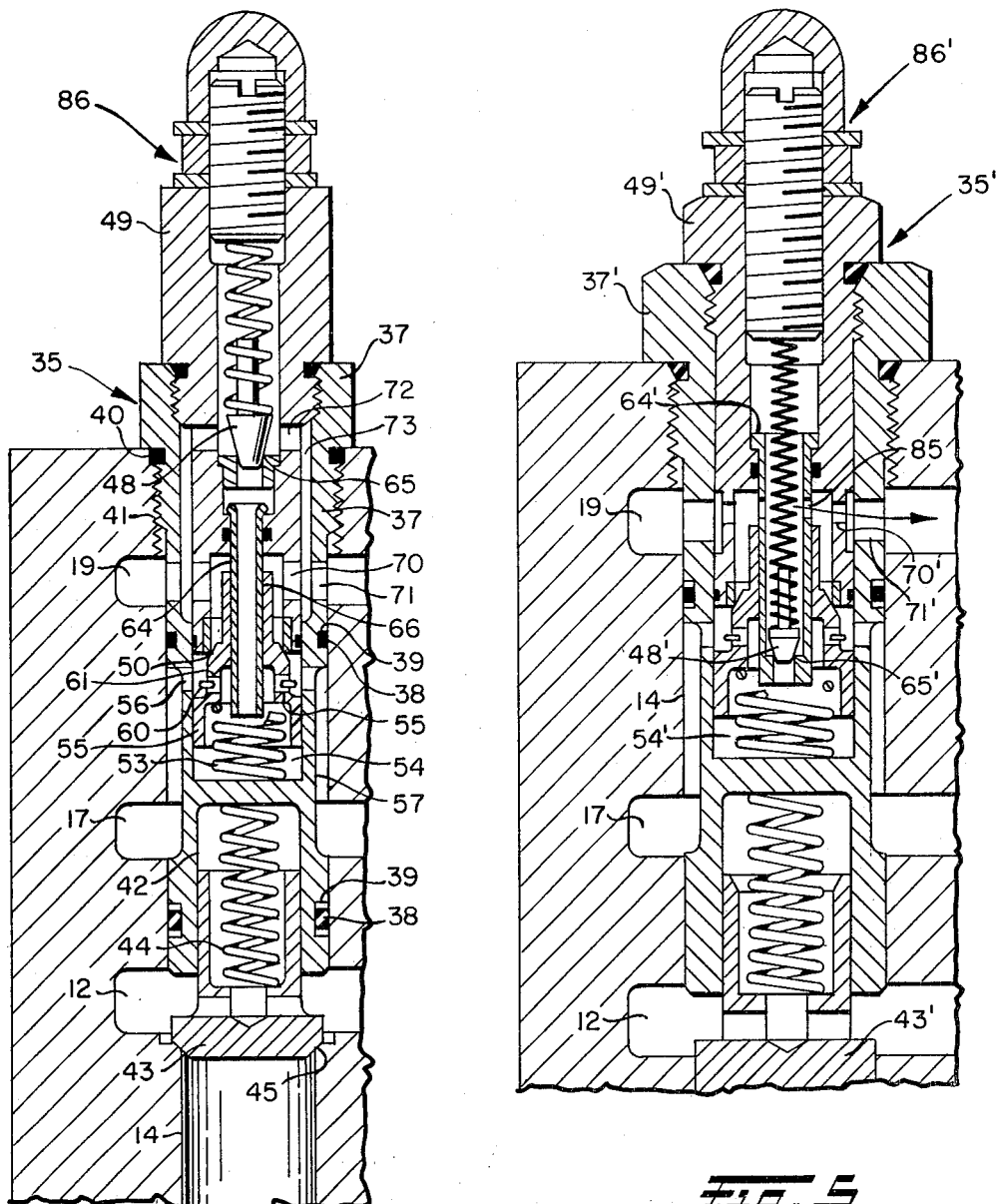

3,506,031
RELIEF-MAKEUP CHECK ASSEMBLY FOR DIRECTIONAL CONTROL VALVES
Hugh J. Stacey, Willoughby, Ohio, assignor to Parker-Hannifin Corporation, Cleveland, Ohio, a corporation of Ohio
Filed Oct. 6, 1967, Ser. No. 673,419
Int. Cl. F15b *21/00;* F16k *17/26, 17/32*
U.S. Cl. 137—596                                      10 Claims

ABSTRACT OF THE DISCLOSURE

A relief-makeup check assembly for direction control valves including a pilot-operated relief valve member for relieving excess pressures which may develop in hydraulic motors under high shock loads, said relief valve member also operating as a check valve to supply additional fluid to the hydraulic motor when the motor pressure drops below the tank pressure thereby preventing cavitation.

Background of the invention

This invention relates to a relief-makeup check assembly which may be relatively compact for use with directional control valves having relatively thin wall sections outwardly of the return passages therein.

There are various known types of pilot-operated relief-makeup check assemblies for directional control valves which effectively relieve shock pressures occasioned as when the directional control valve is shifted from a motor operating position to neutral position while the hydraulic motor is handling a heavy load, and also for supplying additional fluid to the hydraulic motor in response to the motor pressure dropping below tank pressure to prevent cavitation.

Ordinarily, the housing for the directional control valve is provided with one or more bores for the relief-makeup check assemblies which bores are parallel to the spool bores and communicate directly with the various motor and return passages in the valve housing. The discharge through the pilot relief valve for each assembly may be directed to the tank through the same return passage associated with the main relief valve, or a separate return passage may be provided therefor, but in either event the relief-makeup check assembly is generally attached to the housing outwardly of its pilot relief valve, and since the pilot relief valve is usually outwardly of the main relief valve, the valve housing must be relatively thick outwardly of the return passage for the pilot relief valve.

Summary of the invention

With the foregoing in mind, it is a principal object of this invention to provide a relief-makeup check assembly which may be mounted in a bore in a valve housing having a relatively thin wall section outwardly of the return passage for the pilot relief valve. The wall section need only be of sufficient thickness to provide an adequate threaded connection with the relief-makeup check assembly, since the location of the pilot relief valve with respect to such threaded connection is not critical because of a tubular sleeve which communicates with the pilot relief valve, thus permitting the discharge through the pilot relief valve to be directed through an annular chamber between the main and pilot relief bodies to the return passage in the valve housing. The pilot relief valve may be located adjacent an end of the tubular sleeve or anywhere along its length. If located inwardly of the return passage in the valve housing, the annular space between the pilot relief valve and main relief valve bodies for discharging the fluid passing through the pilot relief valve may be eliminated and the pilot relief valve substantially completely received within the valve housing. At present, a large portion of the pilot relief valve generally projects outwardly beyond the valve housing and the valve housing is quite thick, which places certain restrictions on where the valve can be mounted.

Accordingly, another object of this invention is to provide a relief-makeup check assembly which is relatively compact to permit substantially complete insertion within the valve housing.

Still another object is to provide a relief-makeup check assembly of the type described in the form of a cartridge to permit easy insertion and removal of the assembly as a unit, which cartridge unit may include a load check for the associated motor port.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Brief description of the drawing

In the annexed drawing:
FIG. 1 is a longitudinal sectional view through a directional control valve embodying one form of relief-makeup check assembly constructed in accordance with this invention;
FIG. 2 is a fragmentary transverse section through a pair of such relief-makeup check assemblies contained in the valve of FIG. 1, taken on the plane of the line 2—2;
FIG. 3 is a fragmentary transverse section similar to FIG. 2, but through another form of relief-makeup check assembly in accordance with this invention;
FIG. 4 is an enlarged view of the upper portion of FIG. 2; and
FIG. 5 is an enlargement of FIG. 3.

Description of the preferred embodiments

Referring now more particularly to the accompanying drawing and first especially to FIG. 1, there is illustrated a directional control valve 1 the housing 2 of which contains a pair of identical spool valves 3, 4 each axially shiftable in their respective bores 5, 6 for controlling in known manner the operation of a hydraulic motor associated with a mechanism such as a front end loader or the like. Fluid under pressure is supplied to the directional control valve 1 from a pump, not shown, to a pressure inlet port 8 from which the fluid flows into an inlet chamber 9 in communication with a central bypass passage 10 common to both of the spool valve bores 5, 6 and a trunk passage 11 (see FIGS. 1 and 2) communicating with the pressure feed passages 12, 12 and 13, 13 for the respective spool valve bores 5 and 6 through additional bores 14 in the housing 2. Each additional bore 14 is desirably parallel to and closely adjacent its associated spool valve bore 5 or 6, only one being illustrated in FIG. 2 since the other bore is identical.

The pressure feed passages 12, 12 and 13, 13 straddle their respective bypass branches 15, 15 and 16, 16, communicating the bores 5 and 6 with the additional bores 14. Similarly, motor passages 17, 17 and 18, 18 straddle the pressure feed passages and communicate the spool valve bores 5 and 6 with the additional bores 14, as do the return passages 19, 19 which straddle the motor passages 17, 17 and 18, 18.

With the spool valves 3, 4 in neutral position as shown in FIG. 1, fluid entering the chamber 9 is free to pass through the bypass passage 10 for discharge through the fluid return port 20 which may be connected to a fluid reservoir. However, when one or both spool valves 3 and 4 are shifted to an operating position, the bypass passage 10 is closed and fluid under pressure is supplied to one of the motor passages 17, 17 and/or 18, 18 through the trunk passage 11, additional bores 14 and associated pressure feed passages 12, 12 and 13, 13, whereas the other motor passage is communicated to the reservoir through one of the return passages 19, 19 and fluid return port 20. Thus, for example, when the spool valve 3 is shifted upwardly, fluid pressure is supplied to the lower motor passage 17 through the trunk passage 11, associated bore 14, and lower pressure feed passage 12, and the upper motor passage 17 is connected to tank. Downward movement of the spool valve 3 has the reverse effect. A spring centering mechanism 27 may be provided for each of the spool valves 3, 4 to cause automatic return of the spool valves to neutral position upon releasing the actuating force.

Should the pressure supplied by the pump exceed a predetermined level, the excess pressure in the inlet chamber 9 will be relieved to tank through a main relief valve 21 received in a bore 22 communicating the inlet chamber 9 with the return passages 19, 19. The seat 23 for the main relief valve 21 has a central opening 24 therein which is normally blocked by a main relief valve member 25 biased toward the seat by a spring 26, and may be disposed in the bore 22 between the inlet chamber 9 and either of the return passages 19, 19 depending on which end is more accessible for insertion and adjustment of the main relief valve 21. Communication between the other return passage and the inlet chamber 9 is blocked by an extension 28 of the seat 23.

The main relief valve 21 has a pilot valve member 30 which is unseated when the pressure in chamber 31 behind the main relief valve member 25 exceeds the spring seating of the pilot valve member to vent the chamber 31 faster than pressure can be supplied through the orifice 32 in the main relief valve 25. This provides a pressure differential acting on the main relief valve member 25 which is effective to move said main relief valve member away from the seat 23 for relieving excess pressure.

Reference will now be made specifically to FIGS. 2 and 4, which shows a preferred form of relief-makeup check assembly 35 disposed in both ends of the bore 14 associated with the spool valve bore 5. It will be apparent that the bore 14, not shown, associated with the spool valve bore 6 may similarly include such relief-makeup check assemblies. In any event, each relief-makeup check assembly 35 may be in the form of a cartridge permitting easy insertion and removal from the bores 14 as a unit, comprising a main tubular body member 37 screwed into an end of the bore 14 and having a plurality of axially spaced O-ring seals 38 contained in grooves 39 in the outer wall thereof which isolate the pressure feed and return passages 12 and 19 from their associated motor passages 17. An additional seal 40 may be disposed between the main tubular body member 37 and adjacent wall of the bore 14 at the end thereof to prevent fluid leakage from the return passage 19 along the threaded connection 41. The inner end of the main tubular body member 37 may terminate short of the pressure feed passage 12 and be provided with a recess 42 having a load check valve 43 slidable therein which is urged by a weak spring 44 against a seat 45 in the bore 15 located between the trunk passage 11 and pressure feed passage 12 to prevent reverse flow of fluid from the motor circuit of one of the spool valves 3, 4 to the other when both motors are operated simultaneously and one motor is operating under a heavier load than the other.

Inserted into the outer end of the main tubular body member 37 is a pilot relief valve 48 the body member 49 of which has threaded engagement with the main tubular body member 37. The inner end 50 of the pilot relief valve body member 49 terminates between the motor and return passages 17 and 19 and provides a seat for the main relief valve member 52 which is biased against the seat 50 by a weak spring 53. Behind the main relief valve member 52 is a chamber 54 having restricted fluid communication with the motor passage 17 via orifices 55 in the wall of the main valve member 52, radial openings 56 in the main tubular body member 37 and an annular groove 57 in the outer wall of such main tubular body member 37. The orifices 55 may be formed as by inserting the ends 60 of a wire loop into diametrically opposed apertures 61 in the main valve member 52.

Fluid pressure in the chamber 54 acts on the pilot relief valve member 48 through a tubular sleeve 64 mounted in the pilot relief valve body member 49 which extends from adjacent the pilot relief valve seat 65 through a central opening 66 in the main valve member 52. Accordingly, should a high pressure buildup occur in the associated motor passage 17 as when the spool valve 3 is moved from an operating position to neutral position under heavy load conditions, such high pressure will be transmitted from the chamber 54 to the pilot relief valve member 48 unseating the same, which causes the chamber 54 to be vented faster than pressure can be supplied through the orifices 55. This results in a pressure differential acting on the main relief valve member 52 to urge the same out of engagement with its seat 50 for escape of excess fluid pressure to the return passage 19 through the seat 50 and radial openings 71, 70 in the main tubular body member 37 and pilot relief valve body member 49. The tubular sleeve 64 isolates the chamber 54 from the discharge openings 70, 71.

The fluid passing through the open pilot relief valve member 48 may also be discharged through the return passage 19 via radial openings 72 in the pilot relief valve body member 49 behind the pilot valve seat 66 and an annular passage 73 between the main tubular body member 37 and pilot valve body member 49, thereby eliminating the need for a separate return passage for the pilot relief valve member. Moreover, because the annular discharge passage 73 for the pilot relief valve member 48 is between the main tubular body member 37 and the pilot valve body member 49, such passage 73 may extend outwardly beyond the threaded connection 41 between the main tubular body member 37 and valve housing 2, whereby the wall thickness of the valve housing 2 outwardly of the return passage 19 need only be sufficient to provide the desired threaded connection.

Although the seat 65 for the pilot relief valve 48 is shown in FIGS. 2 and 4 disposed adjacent the outer end of the tubular sleeve 64, it will be apparent that such seat 65' may be located within the length of the tubular sleeve 64' as shown in the modified form of relief-makeup check assembly 35' of FIG. 3, making a more compact assembly for insertion into the bore 14 with less projecting outwardly beyond the housing 2 to permit its use within more confined areas. The pilot relief valve 48' and seat 65' are located inwardly of the radial discharge openings 71' and 70' in the body members 37' and 49' whereby the discharge through the pilot relief valve 48' may be directed through radial openings 85 in the tubular sleeve 64' in communication with such radial discharge openings 70', 71' and the radial openings 72 and annular passage 73 may be eliminated. Otherwise, the details of construction and operation of the relief-makeup check assembly 35' of the FIGS. 3 and 5 embodiment are substantially the same as the relief-makeup check assembly 35 shown in FIGS. 2 and 4 and accordingly no further discussion of the same is thought to be necessary. Like parts are identified by the same reference numerals followed by a prime symbol.

Referring once again to FIGS. 2 and 4, the main valve member 52, in addition to relieving high shock pressures, also acts as a check valve, admitting return fluid from the return passage 19 into the associated motor passage 17 whenever the pressure in the motor passage 17 is less than return pressure, as when the hydraulic motor actuated thereby is demanding fluid with the spool valve in neutral position blocking fluid flow, or demanding more fluid than can be supplied by the pump system. The main valve member 52 opens in the same direction as the flow from the return passage 19 to the motor passage 17 and thus fluid flowing past the main member 52 from the return passage to the motor passage will tend to open the main valve member 52 wider for providing greater flow than if the main valve member 52 opened in the opposite direction. Similarly, the pilot valve member 48 opens in the same direction as the fluid flow therethrough or in a direction opposite that of the main relief valve member 52 to provide a larger vent passage for the chamber 54. However, the adjustment device 86 for the pilot valve 48 should be set to permit opening of the pilot valve 48 only when the pressure created by shock loads exceeds the setting for the main relief valve 21 or otherwise the main valve member 52 may open prematurely when heavy loads are being handled by the hydraulic motor.

Although the spool valves shown are of the double acting type, it will be apparent that one or both of such valves may be of the single acting type if desired, in which event only one relief-makeup check assembly 35 will be required for each spool valve. Moreover, any number of spool valves may be provided as required, with or without the relief-makeup check assemblies 35 associated therewith in the manner described above, and the spool valves may be parallel connected as shown to permit any number of the spool valves to be operated at will, or such spool valves may be series-parallel connected in which case only one spool valve could be operated at a time.

I, therefore, particularly point out and distinctly claim as my invention:

1. In combination, a directional control valve comprising a housing having an inlet port, a return passage, and at least one motor passage, and a valve member movable in said housing from a neutral position blocking fluid communication between said inlet port and motor passage to either of two operating positions selectively communicating said motor passage with said inlet port and return passage; and a combination relief-makeup check assembly including a main valve member normally closing communication between said return and motor passages, spring means for yieldably maintaining said main valve member in the closed position, said main valve member acting as a check valve when the fluid pressure in said motor passage drops below the fluid pressure in said return passage to permit flow from said return passage to said motor passage, and means for permitting said main valve member to be moved as a relief valve member to relieve excessive fluid pressure from said motor passage to said return passage; wherein the improvement comprises means mounting said main valve member for opening movement in the same direction as the flow from said return passage to said motor passage, said means for permitting said main valve member to be moved as a relief valve member as aforesaid comprising a fluid chamber behind said main valve member having restricted fluid communication with said motor passage, a pilot valve, and a tubular sleeve extending through said main valve member toward said pilot valve to provide communication between said pilot valve and fluid chamber, said pilot valve being operative to vent said fluid chamber when the pressure therein becomes excessive whereby the pressure in said motor passage will open said main valve member to establish fluid communication between said passages.

2. The combination of claim 1 wherein said pilot valve is contained in a body member which provides a seat for said main valve member.

3. The combination of claim 1 wherein said main valve member has a pair of diametrically opposed apertures therein, and there is a wire loop surrounding said main valve member whose ends are inserted into said apertures to provide such restricted fluid communication between said fluid chamber and motor passage.

4. In combination, a directional control valve comprising a housing having an inlet port for fluid under pressure, a return passage, and at least one motor passage, and a bore containing a valve member movable from neutral position blocking fluid communication between said inlet port and motor passage to either of two operating positions selectively communicating said motor passage with said inlet port and return passage; and an additional bore in said housing having a relief-makeup check assembly therein, said relief-makeup check assembly including a main valve member normally closing communication between said return and motor passages, spring means for yieldably maintaining said main valve member in the closed position, said spring means being operative to permit said main valve member to move as a check valve member when the fluid pressure in said motor passage drops below the pressure in said return passage for flow of fluid from said return passage to said motor passage, and means for permitting said main valve member to be moved as a relief valve member for relieving excessive pressure in said motor passage to said return passage, said last-mentioned means comprising a fluid chamber behind said main valve member having restricted fluid communication with said motor passage, a pilot valve, and a tubular sleeve extending through said main valve member toward said pilot valve to provide communication between said pilot valve and fluid chamber, said pilot valve being operative to vent said chamber when the fluid pressure therein becomes excessive, whereby the pressure in said motor passage acting on said main valve member will open the same.

5. The combination of claim 4 wherein said main valve member is contained in a main tubular body member threaded in said additional bore outwardly of said return passage, said pilot valve member is contained in a pilot valve body member threaded in said main tubular body member outwardly of said pilot valve member, and there is an annular passage between said main and pilot valve body members for directing the fluid passing through said pilot valve member from said fluid chamber to said return passage.

6. The combination of claim 4 wherein said main valve member is contained in a main tubular body member threaded in said additional bore outwardly of said return passage, said pilot valve member is contained in a pilot valve body member threaded in said main tubular body member outwardly of said pilot valve member, and said pilot valve member is contained in said tubular sleeve inwardly of said return passage, said tubular sleeve and body members having radial apertures therein communicating the downstream side of said pilot valve member with said return passage.

7. The combination of claim 5 wherein said housing has a pressure feed passage intersecting said bores, and a trunk passage intersecting said inlet port and additional bore for supplying fluid at inlet pressure to said additional bore, the inner end of said main tubular body member having a check valve therein which is spring biased against a seat in said additional bore between said trunk passage and pressure feed passage for permitting flow only in one direction from said trunk passage to said pressure feed passage.

8. The combination of claim 5 further comprising an annular groove in the outer wall of said main tubular body member communicating said motor passage with the restrictions in said main valve member.

9. The combination of claim 4 wherein said tubular sleeve is mounted in said pilot valve body member.

10. The combination of claim 4 where there are a pair of motor passages in said housing, said valve member being movable in said housing from neutral position blocking fluid communication between said inlet port and both motor passages to either of two operating positions selectively communicating said motor passages with said inlet port and return passage, and there are a pair of said relief-makeup check assemblies in said additional bore normally closing communication between said return passage and said pair of motor passages.

References Cited

UNITED STATES PATENTS

| | | |
|---|---|---|
| 2,980,135 | 4/1961 | Tennis. |
| 3,023,584 | 3/1962 | Markovich ____ 137—596.13 XR |
| 3,160,167 | 12/1964 | Martin _____ 137—596.12 XR |
| 3,212,523 | 10/1965 | Martin _____ 137—596.13 |
| 3,216,446 | 11/1965 | Schmiel _____ 137—596 |
| 3,362,430 | 1/1968 | Olen _____ 137—596 |
| 3,390,700 | 7/1968 | Hodgson et al. 137—596.2 XR |
| 3,000,397 | 9/1961 | Schmiel _____ 137—596.13 |

M. CARY NELSON, Primary Examiner

R. J. MILLER, Assistant Examiner

U.S. Cl. X.R.

137—491, 493, 596.2